(12) United States Patent
Galamb

(10) Patent No.: US 12,255,471 B2
(45) Date of Patent: Mar. 18, 2025

(54) METHOD FOR OPERATING A CONTACTOR

(71) Applicant: Robert Bosch GmbH, Stuttgart (DE)

(72) Inventor: Gergely Galamb, Bad Aibling (DE)

(73) Assignee: Robert Bosch GmbH, Stuttgart (DE)

( * ) Notice: Subject to any disclaimer, the term of this patent is extended or adjusted under 35 U.S.C. 154(b) by 571 days.

(21) Appl. No.: 17/522,969

(22) Filed: Nov. 10, 2021

(65) Prior Publication Data
US 2022/0149639 A1    May 12, 2022

(30) Foreign Application Priority Data

Nov. 12, 2020  (DE) .......................... 102020214239.4

(51) Int. Cl.
*H02J 7/00* (2006.01)
*H02J 7/34* (2006.01)

(52) U.S. Cl.
CPC ........ *H02J 7/00043* (2020.01); *H02J 7/0045* (2013.01); *H02J 7/34* (2013.01)

(58) Field of Classification Search
CPC ..................................................... H02J 7/0043
USPC ............................................................ 320/107
See application file for complete search history.

(56) References Cited

U.S. PATENT DOCUMENTS

| | | | |
|---|---|---|---|
| 3,407,311 A | 10/1968 | Hansen | |
| 5,179,290 A | 1/1993 | Page | |
| 6,002,559 A | 12/1999 | Meyer | |
| 2013/0181793 A1* | 7/2013 | Bauer | H01H 50/541 335/133 |
| 2015/0251542 A1* | 9/2015 | Mensah-Brown | B60L 50/40 307/10.1 |
| 2015/0256014 A1* | 9/2015 | Tzivanopoulos | H02J 7/00 320/137 |
| 2017/0170725 A1* | 6/2017 | Giuliano | H02M 1/088 |
| 2017/0256939 A1* | 9/2017 | Logiudice | H02H 9/046 |

FOREIGN PATENT DOCUMENTS

| | | |
|---|---|---|
| DE | 2912404 A1 | 10/1979 |
| DE | 102014211400 A1 | 12/2015 |
| JP | S60174052 A | 9/1985 |
| JP | 2021114875 * | 8/2021 |

\* cited by examiner

*Primary Examiner* — Yalkew Fantu
(74) *Attorney, Agent, or Firm* — Michael Best & Friedrich LLP

(57) ABSTRACT

A method for operating a contactor (10) is described, wherein the contactor (10) comprises at least two contacts (18, 20, 22) electrically conductively connected to one another in a closed state of the contactor (10), having the method steps of partially charging an DC link capacitance (103) in electrical contact with the contactor (10) and closing the contactor (10).

14 Claims, 3 Drawing Sheets

METHOD FOR OPERATING A CONTACTOR

BACKGROUND OF THE INVENTION

The present invention relates to a method for operating a contactor, and also to an electrical circuit and a battery system each containing said contactor.

Batteries, such as lithium-ion batteries, for example, are widespread in many day-to-day applications. They are used, for example, in computers, such as laptops, cell phones, smartphones and in other applications. Such batteries also afford advantages in the electrification of vehicles which is being promoted strongly at present.

In such batteries or battery modules, but also in other high-voltage applications, contactors are often used to interrupt an electrical line, for example in order to disconnect the potential at the terminals of a battery. In the contactors, the main contact is often closed by way of a contact bridge in order to establish a conductive connection between the main connectors.

Contactors are often hermetically sealed so that neither moisture nor contamination can enter the interior of the contactor. In this case, it is known that non-conductive particles, which enter the interior of the contact chamber or which separate from the housing, for instance during production, can be deposited on the contact surfaces in the open state of the contactor. In this case, although the contact is closed when the contactor is activated, these non-conductive particles can prevent or limit sufficient electrical contact.

Document DE 29 12 404 A1 describes a circuit arrangement for the operation of a high-power electrical system. Such a circuit arrangement can be operated in such a way that an intense current pulse is provided along the relay contacts located in a weak circuit in order to produce an arc. Particles that are located between the relay contacts are thus intended to be burnt off.

Document U.S. Pat. No. 5,179,290 furthermore describes a method for keeping contacts clean and substantially free from contaminates. To this end, the contacts are separated under load at specific times such that an arc is produced.

Document U.S. Pat. No. 6,002,559 further discloses a circuit arrangement for an electrical motor system in order to reduce contaminates on contacts. In this case, an arc is produced in order to clean the contacts.

Document U.S. Pat. No. 3,407,311 further discloses a telegraph distributor in which contacts are connected to a voltage source. In this case, an arc can be produced in order to remove contaminates found on the contacts.

Moreover, DE 10 2014 211 400 A1 discloses a method for operating a contactor, in which it is detected whether an excessive contact resistance exists between the contacts of the contactor when the contactor is closed, whereupon the contactor is then opened and closed multiple times.

JP S60174052A furthermore discloses a method for cleaning contacts by producing an arc.

SUMMARY OF THE INVENTION

The subject matter of the present invention is a method for operating a contactor, and also an electrical circuit and a battery system containing said electrical circuit, having the characterizing features of the independent patent claims.

Advantages of the Invention

Accordingly, a method for operating a contactor is provided, wherein the contactor comprises contacts, which are electrically conductively connected to one another in a closed state of the contactor, and the method according to the invention is based on the fact that an intermediate circuit capacitance, which is in electrically conductive contact with the contactor, is first partially charged before the contactor is closed. In a second step, the contactor is then closed, wherein the contacts of the contactor are electrically conductively connected to one another.

The advantage of this method is based on the fact that, when the contactor is closed, an increased flow of current is effected between a battery arranged upstream of the contactor and the DC link capacitance via the contactor due to merely a partial charging of the DC link capacitance, which on the one hand is electrically conductively connected to the contactor and on the other hand is located between the contactor and, for example, an inverter. In this case, an arc arises when the contactor is closed.

The reason for this is that, while the contactor is being closed, first of all the contacts of the contactor first come into contact with one another, wherein, due to the two contacts meeting one another mechanically for the first time, one of the contacts, also referred to as contact bridge, briefly lifts up again and in this way produces an arc before the contact is permanently closed. This process is also referred to as bouncing.

The greater the voltage difference between a battery connected to the contactor and the partially precharged DC link capacitance, the greater or more energy-intensive the correspondingly produced arc. The arc that arises corrodes possible contamination particles on the contact surface in the vicinity of a contact point of the two contacts of the contactor by way of the thermal energy released or the correspondingly released UV radiation. Since contactors are usually designed for isolating currents at a level of several thousand amperes, occasional cleaning of the contacts the contactor in the above-described manner generally leads only to negligible ageing of the components of the contactor, since it is carried out only occasionally over a life cycle of the contactor.

It is thus advantageous when the DC link capacitance is partially precharged only up to a value of 60-95%, preferably of 60-85%, in particular of 60-80%, of a battery voltage that is to be associated with a battery connected to the contactor.

Before a battery is electrically conductively connected to an inverter via a contactor, a DC link capacitance of the inverter is usually precharged in order that the contactor does not switch into a discharged DC link capacitance of the inverter and thus a short-circuit current of several thousand amperes arises. This would damage both the DC link capacitance and the contactor or battery cells of a corresponding battery.

The DC link capacitance is advantageously precharged by way of a precharging device, which is connected in parallel with the contactor, for example, and which has a precharging contactor and a precharging resistor, for example. As an alternative, the precharging device can also have an electron pump or a combination of a semiconductor switch with a downstream electrical resistor, in particular when voltages in the range of less than 300 V, for example 60 V, are used. In this way, the DC link capacitance can be partially precharged before the actual contactor is conductively connected between a battery and, for example, an inverter.

Provision is now made for the DC link capacitance to be precharged only up to a voltage of 60-95% of the battery voltage in order to clean contact faces of the main contactor.

The arc that then results when the main contactor is switched leads to cleaning of the contact faces of the main contactor.

According to a particularly advantageous embodiment of the present invention, the method according to the invention is carried out only when a contact resistance that is above a predefined value is determined between the contacts of the contactor when the contactor is closed. In this case, it can be assumed that the increased contact resistance can be attributed to contamination of at least one surface of the contacts of the contactor.

In order to remove this contamination, the method according to the invention for operating a contactor is then carried out and the arc that results in this case leads to a removal of the contamination on surfaces of the contacts of the contactor.

The invention furthermore provides an electrical circuit, which comprises a control unit, which is designed to carry out a method of the above-described type.

The electrical circuit advantageously further comprises a precharging device, comprising a precharging contactor and a precharging resistor, in order to ensure a partial precharging of a DC link capacitance of an inverter connected to the contactor.

The method according to the invention and the electrical circuit according to the invention make it possible in a simple manner to remove contamination within a contactor and thus to optimize the lifetime of a corresponding contactor and the reliability of a battery system containing said contactor.

A corresponding battery system comprising the electrical circuit according to the invention can be applied in electrically driven vehicles, in fuel cell systems or in systems for stationary storage in particular of regeneratively obtained electrical energy.

BRIEF DESCRIPTION OF THE DRAWINGS

Advantageous configurations of the present invention are illustrated in the drawing and explained in more detail in the following description of the figures, in which.

DETAILED DESCRIPTION

Figure 1:
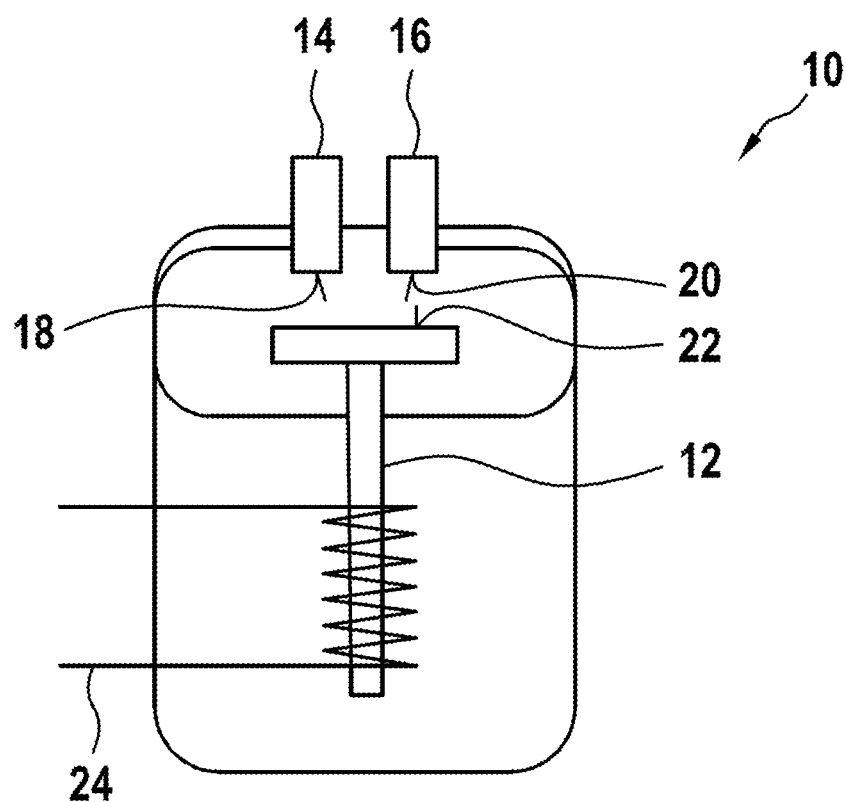
FIG. 1 shows a schematic view of a configuration of a contactor.

FIG. 1 shows a contactor 10, which may be a component of a battery system and which can be operated by way of a method according to the invention.

The contactor 10 has a total of three contacts, of which one is configured as a contact bridge 12 and two further contacts are configured as bearing contacts 14, 16 for the contact bridge 12. The bearing contacts 14, 16 in this case each have a bearing contact face 18, 20, which can come into contact with a bearing contact face 22 of the contact bridge 12 in order to close an electrical line. Furthermore, the contact bridge 12 or a limb thereof is surrounded by a coil 24. If a voltage is applied to the coil 24, the limb of the contact bridge 12, also referred to as solenoid plunger, moves in the direction of the bearing contacts 14, 16, as a result of which these are conductively connected to one another as a result of abutting against the contact bridge 12 and a corresponding electrical line is closed. In this case, if necessary, the limb can be removed from the bearing contacts 14, 16 again, for example by way of a spring force, after the coil 24 has been switched off.

In the event that a particle of dirt is present on one of the bearing contact faces 18, 20, 22, a sporadic fault may arise, which can cause insufficient electrically conductive contact or an excessively high contact resistance of the contact to arise between the bearing contact faces 18, 20 of the bearing contacts 14, 16 serving as contacts and the bearing contact face 22 of the contact bridge 12.

Figure 2:
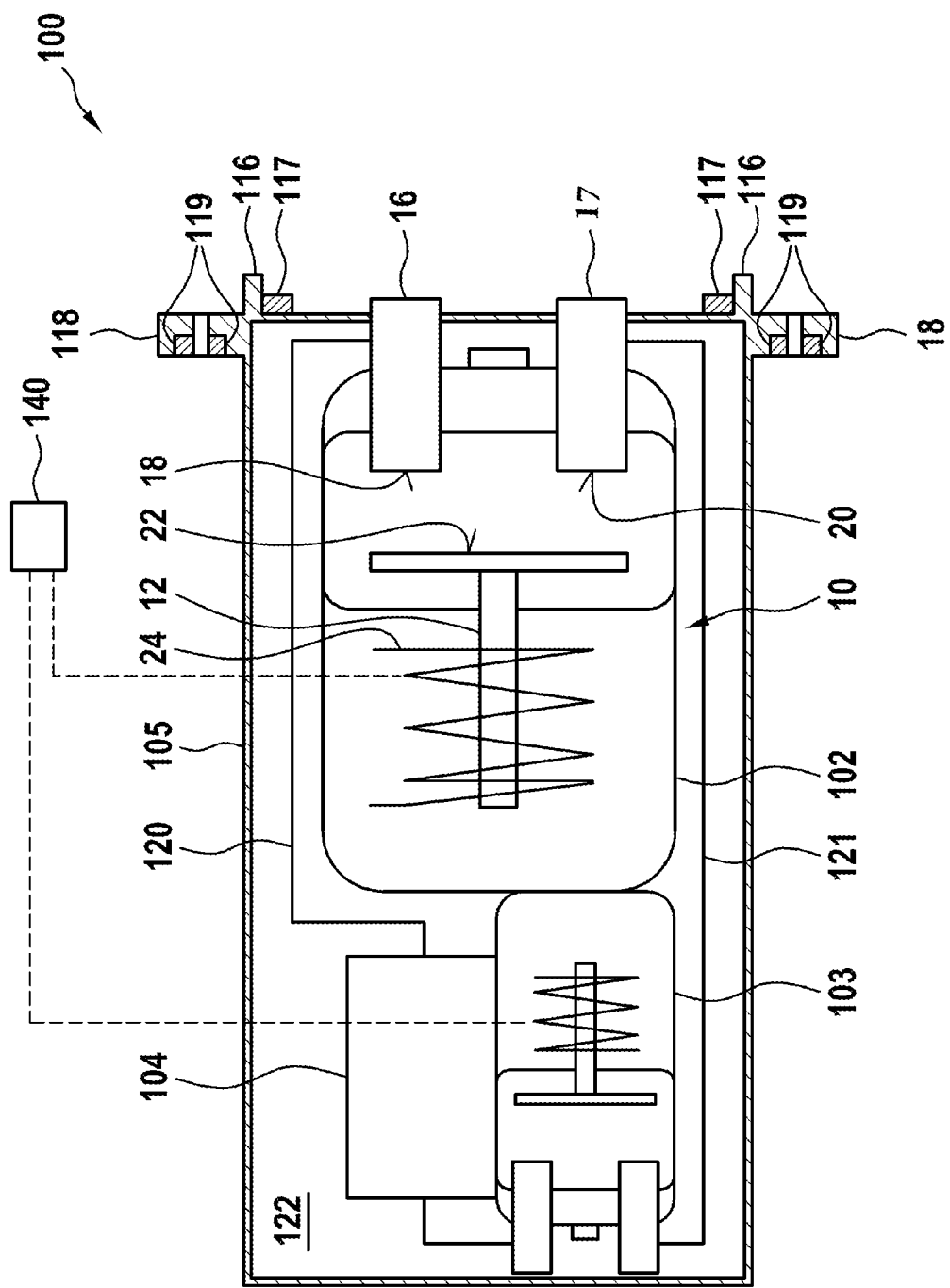
FIG. 2 shows the schematic illustration of an electrical circuit according to an embodiment of the present invention.

FIG. 2 shows an electrical circuit, comprising a contactor as is illustrated, for example, in FIG. 1.

The electrical circuit 100 comprises a housing 105 from which two electrical connections 16, 17 protrude. Both are configured to be electrically connected to each other either via the contactor 10, which closes in the direction of the connections 16, 17, or via a series circuit composed of a precharging resistor 104 and a precharging contactor 103, which opens in the direction of the connections 16, 17. The contactor 10 and the precharging contactor 103 are arranged "back-to-back" with respect to one another, for example, with the result that the smaller volume of the precharging contactor 103 permits the precharging resistor 104 to be arranged next to the precharging contactor 103.

The narrow side of the housing 105 on which the external connections 16, 17 project out of the housing is surrounded by a collar 116. A rubber lip 117 as a solid-borne sound isolating unit is arranged inside the collar 116, for example, said solid-borne sound isolating unit being able to absorb a prestress between the housing 105 of the illustrated electrical circuit 100 and its surroundings. In addition, a flange 118 for screwing the electrical circuit 100 to its surroundings is provided outside the collar 116. The flange 118 also has rubber elements 119 for solid-borne sound isolation, for example.

The housing 105 is additionally filled with a thermal conducting medium 122, for example, which serves to cool the precharging resistor 104 and the contactors 10, 103. A further function of the thermal conducting medium 122 is to embed electrical lines 120, 121 between the external connections 16, 17 and the precharging contactor 103 or the precharging resistor 104 and between the precharging contactor 103 and the precharging resistor 104, and therefore protect them against mechanical impacts. In addition, the thermal conducting medium 122 assumes the function of solid-borne sound insulation with respect to the operating noise of the contactors 10, 103.

The unit composed of the precharging contactor 103 and precharging resistor 104 is also frequently referred to as a precharging circuit. In other words, the electrical circuit according to the invention can be described as or conceived as being a housing unit comprising a precharging circuit together with a main contactor.

Figure 3:
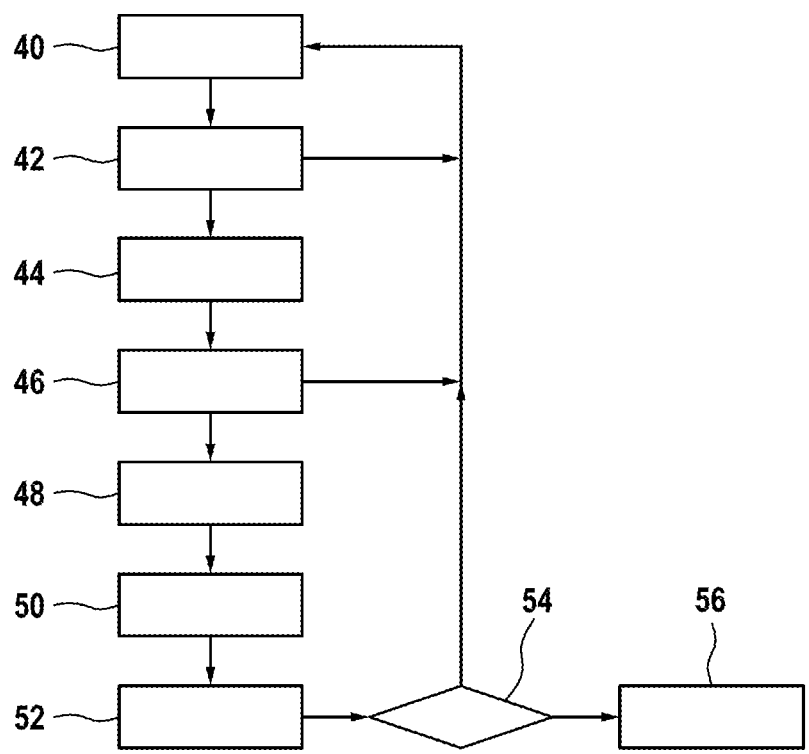
FIG. 3 shows the schematic flowchart of the method according to the invention.

The electrical circuit 100 illustrated in FIG. 2 furthermore comprises a control means 140, which is embodied as a control device, for example. This is embodied to be in data-carrying contact with the coil 24 of the contactor 10, and also in data-carrying contact with the precharging contactor 103. Integrated in the control unit 140 are memory and control means, which are suitable for carrying out the method according to the invention by means of the electrical circuit 100, which method is illustrated and described in more detail in the following FIG. 3.

The method according to the invention is based on the fact that, in a first step 40, the contactor 10 is closed and, in a subsequent second step 42, a check is carried out to determine whether the contact resistance between the bearing contact faces 22 and 18 or 20 exceeds a predefined electrical contact resistance or not. If the contact resistance is not above the predefined contact resistance, the first step 40 is repeated, where necessary, after a certain period of time has elapsed.

If the determined contact resistance exceeds the predetermined contact resistance, a DC link capacitance is partially precharged in a third step 44 by means of the precharging device comprising a precharging contactor 103 and a precharging resistor 104. As soon as the DC link capacitance reaches a voltage level corresponding to 60-95% of a battery voltage of a battery connected to the contactor 10, the contactor 10 is closed in a fourth step 46. In this case, the surfaces of the bearing contact faces 18, 20, 22 of the contactor 10 are cleaned on account of the arc produced here.

The surfaces 18, 20, 22 of the contactor 10 can optionally be cleaned again, for example, after a further selectable period of time has elapsed. In this case, a further first step 48 is optionally initiated, in which the contactor 10 is opened, the DC link capacitance is partially precharged again by means of the precharging device in an optional second step 50 and the contactor 10 is closed again in an optional third step 52 and the surfaces 18, 20, 22 of the contactor 10 are cleaned again on account of the arc arising in this case.

In a checking step 54, a check is then carried out to determine whether the electrical contact resistance of the contactor 10 is below a predetermined contact resistance and, if this is the case, the first step 40 is initiated again, where necessary, after a predetermined period of time.

However, if the contact resistance continues to be above the predetermined contact resistance, a fault display is output in an information step 56, for example.

The invention claimed is:

1. A method for operating a contactor (10), wherein the contactor (10) comprises contacts (18, 20, 22) electrically conductively connected to one another in a closed state of the contactor (10), the method comprising the following steps:
   a) partially charging, via a control unit (140), a DC link capacitance (103) in electrical contact with the contactor (10);
   b) closing, via the control unit (140), the contactor (10);
   c) producing an arc while closing the contactor to clean a surface of the contacts; and
   d) detecting whether the contacts (18, 20, 22) of the contactor (10) make contact with a contact resistance that is above a predefined value when the contactor (10) is closed, and carrying out method steps a) and b) only when the contact resistance is above the predefined value.

2. The method according to claim 1, wherein the DC link capacitance (103) is partially precharged up to a value of 60-95% of a battery voltage of a battery connected to the contactor.

3. The method according to claim 1, wherein the DC link capacitance (103) is partially precharged by means of a precharging device, comprising a precharging contactor (103) and a precharging resistor (104), an electron pump or a combination of a semiconductor switch with a downstream electrical resistor.

4. The method according to claim 1, wherein, in method step b), the current flowing through the contactor (10) is measured or the time until the DC link capacitance exceeds a voltage threshold value is measured.

5. The method according to claim 4, wherein the contact resistance at a current intensity in a range of from $\geq 100$ A to $\leq 200$ A is in a range of from $\geq 0.1$ m$\Omega$ to $\leq 2$ m$\Omega$.

6. The method according to claim 1, further comprising moving one of the contacts between an open position and a closed position.

7. The method according to claim 6, further comprising supplying a voltage to a coil surrounding a limb of the contact bridge.

8. The method according to claim 7, wherein supplying the voltage to the coil moves one of the contacts between the open position and the closed position.

9. An electrical circuit system comprising:
   a control unit (140); and
   at least one contactor (10) having at least two contacts (14, 16, 20) that can make contact with one another in a closed state of the contactor (10), wherein the contactor (10) is controllable via the control unit (140), and wherein the control unit (140) is configured to:
   a) partially charge a DC link capacitance (103) in electrical contact with the contactor (10);
   b) close the contactor (10) to produce an arc that cleans a surface of the at least two contacts; and
   detect whether the contacts (18, 20, 22) of the contactor (10) make contact with a contact resistance that is above a predefined value when the contactor (10) is closed, and carry out steps a) and b) only when the contact resistance is above the predefined value.

10. The electrical circuit system according to claim 9, wherein said electrical circuit has an DC link capacitance (103), which is configured to connect to a battery via a precharging device, wherein the precharging device comprises a precharging contactor (103) and a precharging resistor (104), an electron pump or a combination of a semiconductor switch with a downstream electrical resistor.

11. The electrical circuit system according to claim 9, wherein at least one of the two contacts is a contact bridge moveable between an open position and a closed position.

12. The electrical circuit system according to claim 11, wherein the arc is produced when the contact bridge is moving from the open to the closed position.

13. The electrical circuit system according to claim 12, further comprising a limb extending from the contact bridge and surrounded by a coil.

14. The electrical circuit system according to claim 13, wherein the contact bridge moves between the open position and the closed position when a voltage is supplied to the coil.

* * * * *